April 17, 1928.

T. C. HOLLIDAY 1,666,856

TILTABLE AND DIRIGIBLE HEADLIGHT

Filed June 16, 1925

2 Sheets-Sheet 1

WITNESSES

INVENTOR
T. C. Holliday.
BY
ATTORNEYS

April 17, 1928.

T. C. HOLLIDAY

TILTABLE AND DIRIGIBLE HEADLIGHT

Filed June 16, 1925

1,666,856

2 Sheets-Sheet 2

WITNESSES
W. A. Williams.

INVENTOR
T. C. Holliday.
BY
ATTORNEYS

Patented Apr. 17, 1928.

1,666,856

UNITED STATES PATENT OFFICE.

THOMAS C. HOLLIDAY, OF CANTON, MISSISSIPPI, ASSIGNOR TO HOLLIDAY LIFE SAVING HEADLIGHT CO., OF JACKSON, MISSISSIPPI, A CORPORATION OF MISSISSIPPI.

TILTABLE AND DIRIGIBLE HEADLIGHT.

Application filed June 16, 1925. Serial No. 37,567.

This invention relates to an improvement in headlights of the type forming the subject-matter of my prior Patent No. 1,607,349 dated Nov. 16, 1926, for dirigible headlight.

An object of the invention is to provide an improved dirigible headlight of this character which is so constructed and organized that it may be tilted to throw the beams of light downwardly when approaching and passing another vehicle or at any other time that such action is desirable. This advantage is had and at the same time the lights are rigidly supported and maintained in their normal position so as to eliminate noise or vibration.

A further object resides in the provision of a headlight having these advantages and capacities and which has associated with its operating mechanism a novel form of speed reduction gearing adapted to impart to the headlights the proper movement when the vehicle is steered, the speed reduction gearing being releasable to disconnect the operating mechanism from the steering gear when desired.

A still further object resides in the provision of a headlight of the character specified which is of simple and durable construction, reliable and noiseless in operation and easy and comparatively inexpensive to manufacture and install.

Figure 1:
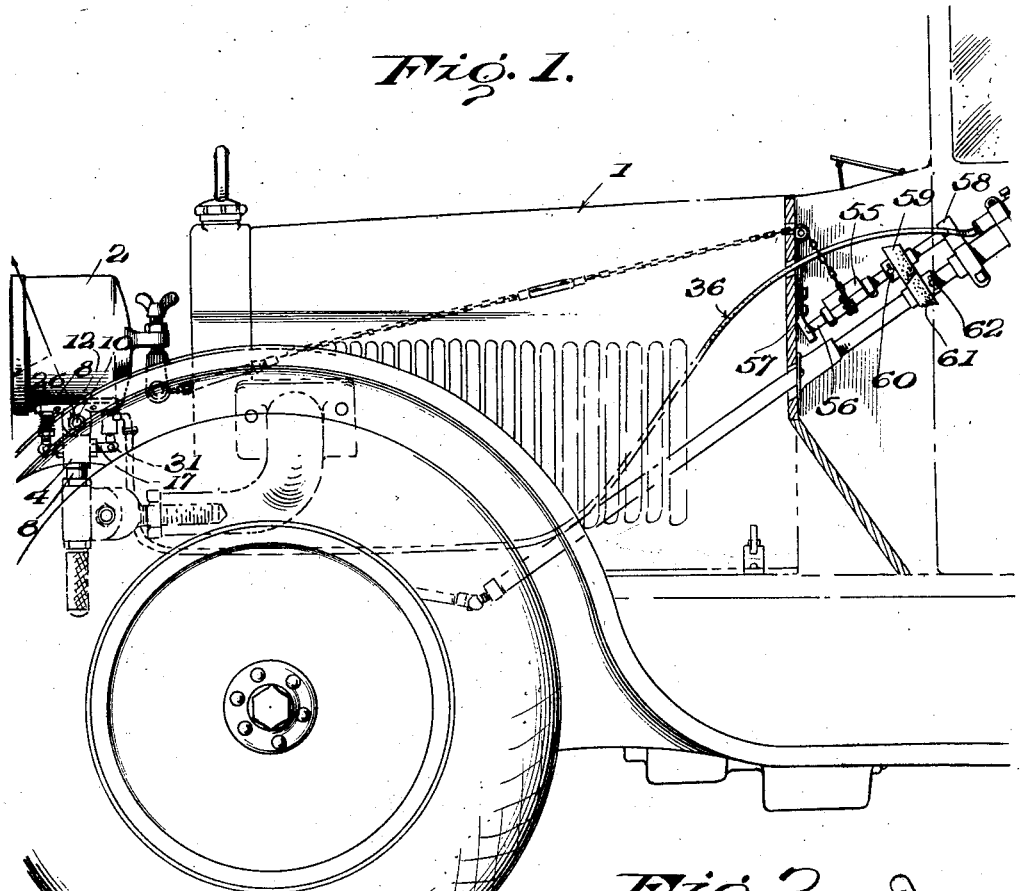
Figure 2:
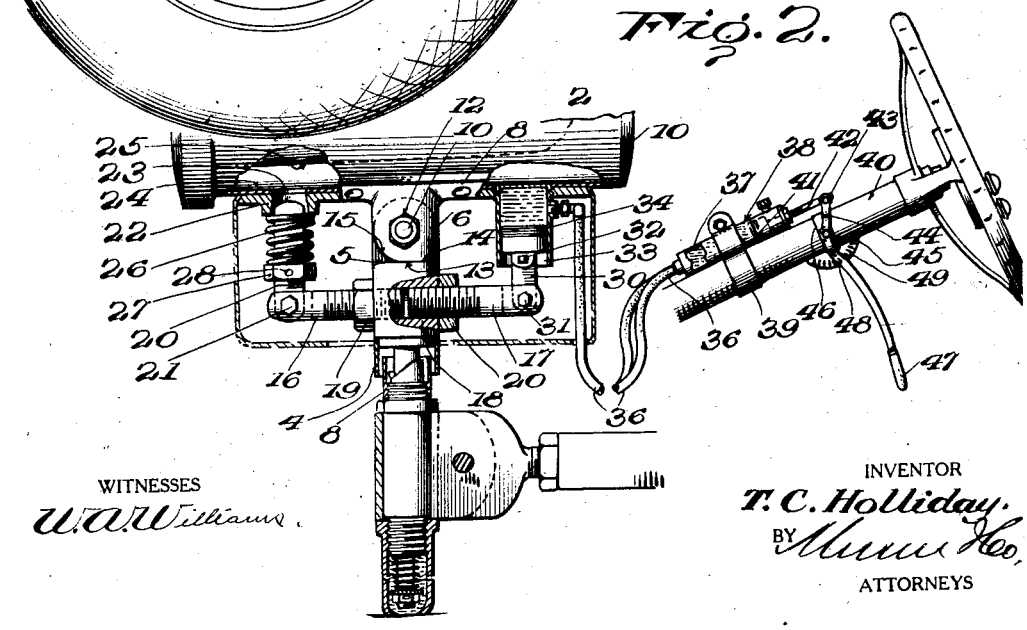
Figure 3:
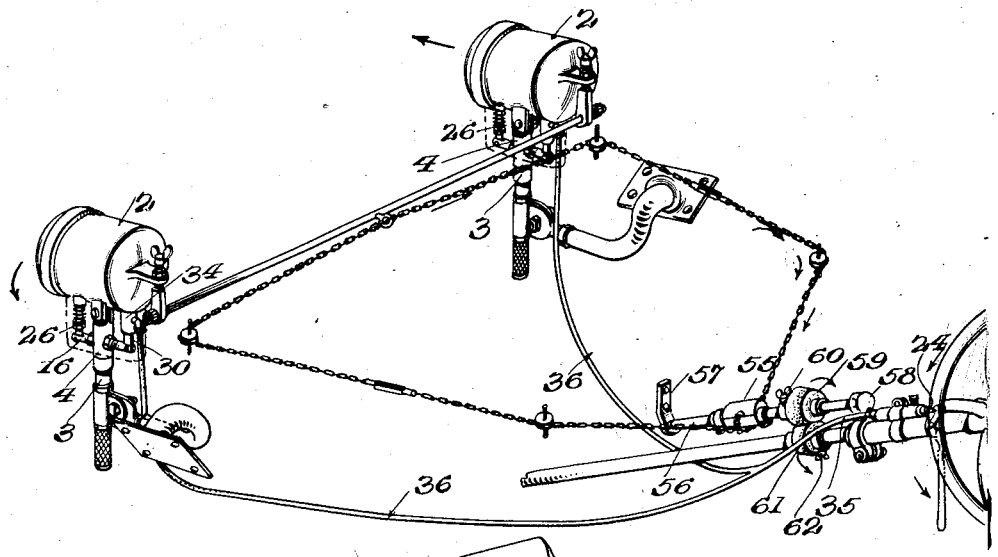
Figure 4:
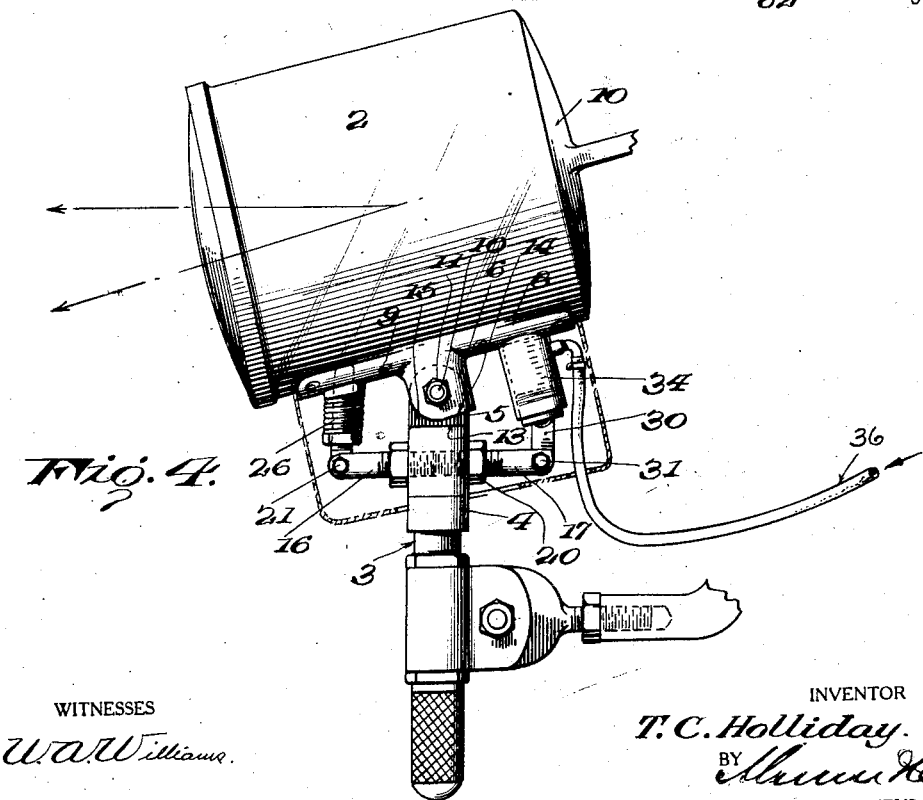

Other objects and advantages reside in certain novel features of the construction, arrangement and combination of parts which will be hereinafter more fully described and particularly pointed out in the appended claims, reference being had to the accompanying drawings forming a part of this specification, and in which:

Figure 1 is a view partly in side elevation and partly in section showing an embodiment of the invention, Figure 2 is a fragmentary view partly in side elevation and partly in section illustrating a means employed for tilting the headlights, Figure 3 is a diagrammatic perspective view illustrating the parts embodying the present invention, and Figure 4 is a view partly in elevation and partly in section showing one of the lamps or headlights tilted.

Referring to the drawings the numeral 1 designates generally an automobile which may be any type of motor vehicle and which has headlights 2 mounted and swung from the steering post by the mechanism shown, described and claimed in my co-pending application filed Dec. 15, 1924, Serial No. 756,056, to which reference is had for a fuller explanation of the means for mounting and swinging the headlights from the steering gear of the vehicle.

The present invention proposes to make the headlights 2 tiltable as well as dirigible and for this purpose the post 3 of each headlight has its upper end enlarged, as at 4, and provided with a centrally located apertured lug or ear 5 which is fitted in between similar lugs or ears 6 integral with or suitably connected to a steel plate 8 riveted, as at 9, to the casing 10 of the headlight. A pivot bolt 11 is inserted through the aligned apertures of the lugs or ears 5 and 6 and is held against displacement by means of a nut 12. At the juncture of the lug 5 and the enlarged portion 4 flat horizontal shoulders 13 are formed and are engageable with similarly formed portions 14 on the lugs 6 to limit the swinging movement of each headlight in one direction to a position where its beam is projected horizontally or where its beam is projected at the small angle to the horizontal required by the traffic regulations, or in other words, the shoulder 13 and the portions 14 of the lugs 6 limit the swinging movement of each headlight 10 to normal position. Forwardly the lugs 6 are rounded off, as at 15, to permit the headlights to swing in a clockwise direction as viewed in the drawing so that tilting of the headlights may be effected.

Means for tilting the headlights and for rigidly holding them in normal position is provided and as this means is practically the same for the two headlights a single description will serve for the common features of each.

A pair of threaded studs, designated at 16 and 17, is provided in conjunction with each headlight, the studs 16 and 17 being threaded into the opposite end of an internally threaded socket 18 extending fore and aft through the enlarged portion 4 of the post 3. Nuts 19 and 20 hold the studs 16 and 17 in proper adjustment. A short threaded rod 20 has its lower end pivotally connected, as at 21, to the stud 16 and the upper end of this rod 20 has a loose sliding fit in a flanged opening 22 provided in the plate 8. The rod 20 operates through the opening 22 and through an opening 23 in the casing 10 and in the space or clearance 24 provided between the reflector 25 and the casing 10. On the rod 20 a heavy compression coil spring 26 is arranged and is placed under considerable tension or compression in the assembly, one end of the coil spring engaging the flange around the opening 22 and the other end being engaged by a tensioning nut 27 threaded on the rod 20 and pinned, as at 28, to the rod so as to be securely held in its adjustment.

The outer end of the stud 17 is bifurcated and receives between its bifurcations one end of a link 30 to which it is pivotally connected, as indicated at 31. The other end of the link 30 is pivotally connected, as at 32, to a piston 33 operatively fitted in a cylinder 34 securely fastened to the plate 8. Suitable packing is provided between the piston 33 and the cylinder 34 to insure a fluid-tight fit between these parts.

The cylinder 34 and piston 33 constitute elements of hydraulic operating mechanism for the light tilting means, this mechanism also including a flexible pipe or other suitable conduit 35 having branches 36 leading to the cylinders 34. The conduit 35 is connected to one end of the cylinder 37 of a pump 38 which may be conveniently fastened by a clamp 39 to the steering post 40. A plunger 41 is operatively fitted in the cylinder 37 of the pump 38 and has a plunger rod 42 projecting exteriorly of the cylinder and connected by a pin and slot arrangement or other suitable form of connection to one end of an operating lever 44 fulcrumed, as at 45, on a mounting 46 carried by the steering post. The lever 44 has a handle 47 and also carries a spring latch 48 co-operable with a quadrant 49 to hold the lever 47 in adjusted position. Oil or other suitable fluid is used to fill the hydraulic mechanism, the oil or other fluid completely filling the cylinder 34, the pipe 35 and its branches 36 and the cylinder 37 of the oil pump 38.

With this arrangement the spring 26 holds the headlight in its normal position until the lever 46 is manipulated to force the oil from the oil pump 38 into the cylinder 34 which displaces the cylinder 34 and the lamp upwardly about the pivot 10 or in other words swings the lamp in a counterclockwise direction, as viewed in the drawings. This action continues until the convolutions of the spring 26 engage each other or in other words until the spring is closed when the spring positively stops further swinging movement of the lamp and limits the downward tilting movement thereof. When the lever 46 is moved back to its original position the spring 26 returns the lamp to its normal position.

The operating mechanism for the dirigible headlights is the same as shown and described in my co-pending application hereinabove referred to with the exception that the double throw differential cams 55 instead of being mounted on the steering post are clamped on a countershaft 56 carried by bearings 57 and 58. The countershaft 55 has a beveled friction gear 59 mounted thereon and releasably fastened thereto by means of a thumb screw or set screw 60 threaded through the hub or collar of the gear and engageable with the countershaft 56. A similar small gear 61 is mounted on the steering post and is fixed to turn with the steering post by means of a thumb screw 62 which also may be readily manipulated to release the gear 61.

With the design of steering gear employed with automobiles equipped with balloon tires this arrangement is especially advantageous as it serves to properly move the headlights to the desirable range when the vehicle is steered. The arrangement has the further advantage of being readily releasable to disconnect the steering gear or the steering post thereof from the operating mechanism for the headlights.

This design of steering gear also makes it easy to obtain the exact and proper adjustment required and is especially advantageous over spur gears where the size of the teeth make it difficult to obtain the exact adjustment as even one tooth out of the way would make one light pick up quicker than the other which would, of course, be undesirable. With the spur gears adjustment may be had to insure proper movement of both lights.

I claim:

1. In combination with a headlight, means for mounting the headlight for tilting movement downwardly and forwardly, a stud secured on said means, a rod pivoted to the stud and having sliding engagement with the headlight, a spring on the rod for urging the headlight to normal position, a second stud also carried by said means, a cylinder fixed to the headlight casing, a piston fitted in the cylinder, a link between the piston and the second stud, a manually operable pump mounted on the steering post of an automobile and connected with the cylinder.

2. A device of the character described, and in accordance with claim 1 and wherein the pump has a lever operated plunger.

3. In combination with a vehicle having a pair of dirigible headlights, and means for operating the headlights from the steering gear of the vehicle, each headlight having a post provided with an enlargement, means for pivotally mounting each headlight on the enlargement of its post, said means having positive and rigid interengaging parts to limit the upward movement of the headlights to normal position, means on each enlargement and co-operable with each headlight to urge each headlight to normal position, and hydraulic mechanism for tilting the headlights.

4. In combination with a vehicle having a pair of dirigible headlights, means for operating the headlights from the steering gear of the vehicle, each headlight having a post provided with an enlargement, means for pivotally mounting each headlight on the enlargement of its post including a central upstanding apertured ear carried by the enlargement, a pair of similar ears carried by the headlight and embracing the apertured ears, a pivot extending through the apertures of the ears, the enlargement presenting shoulders at the junction of the ear and enlargement, the rear portions of the headlights being engageable with the shoulders to limit the upward swinging movement of the head, the forward portions of the ears of the headlights being rounded off to permit downward tilting of the headlights, means on each enlargement and co-operable with each headlight to urge each headlight to normal position, and hydraulic mechanism for tilting the headlights.

THOMAS C. HOLLIDAY.